United States Patent [19]

Vega et al.

[11] Patent Number: 4,900,891
[45] Date of Patent: Feb. 13, 1990

[54] LASER ICE REMOVAL SYSTEM

[76] Inventors: Roger Vega; Rose M. Vega, both of Saddle Club Rd., R.D. #7, Kittanning, Pa. 16201

[21] Appl. No.: 208,453

[22] Filed: Jun. 20, 1988

[51] Int. Cl.$^4$ .............................................. B23K 26/00
[52] U.S. Cl. ........................... 219/121.6; 219/121.65; 219/121.66; 219/121.85
[58] Field of Search .......... 219/121.6, 121.85, 121.76, 219/121.78, 121.8

[56] References Cited

U.S. PATENT DOCUMENTS 4,379,217  4/1983  Youmans .......................... 219/121.6

Primary Examiner—C. L. Albritton
Attorney, Agent, or Firm—Clifford A. Poff

[57] ABSTRACT

A system to remove ice formed on a surface, such as an airplane wing. Heat generative laser beam is directed upon a snow or ice-covered surface, thereby vaporizing the ice and snow formed thereupon. By translating the laser light generator along the frozen surface, vaporization of the snow and ice formed on the entire surface takes place.

21 Claims, 3 Drawing Sheets

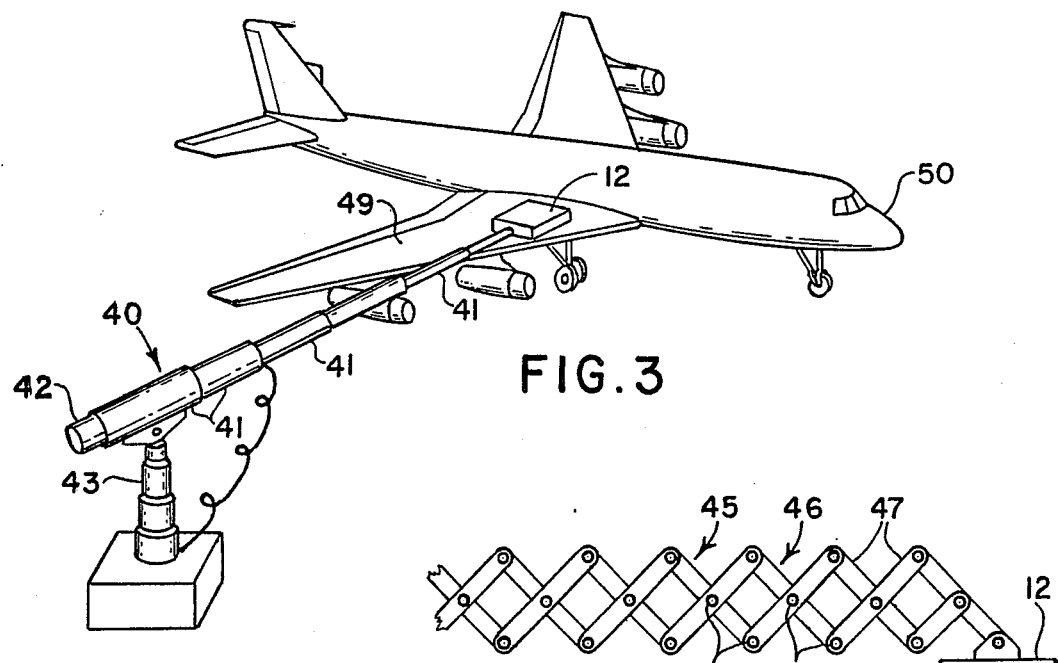
FIG. 3
FIG. 4
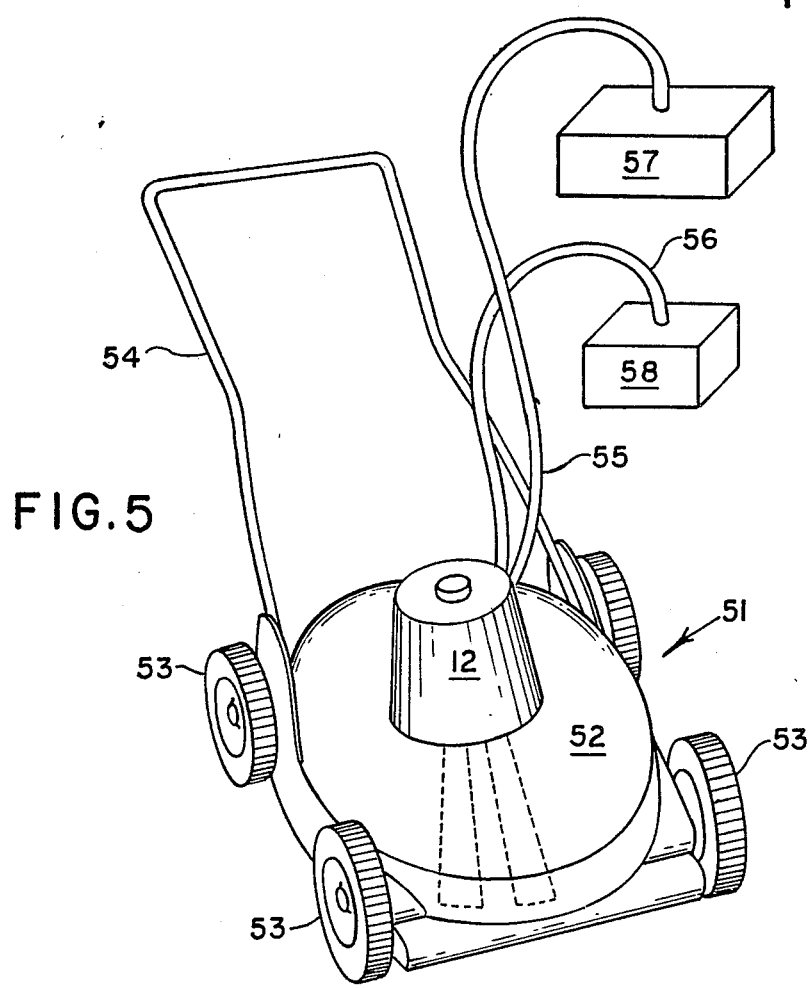
FIG. 5

LASER ICE REMOVAL SYSTEM

BACKGROUND OF THE INVENTION

1. Field of the Invention: The present invention relates to a snow and/or ice removal system, and, more particularly, to a system for removing snow or ice from a surface, such as the wing surface of an airplane.

2. Description of the Prior Art: Ice formation on aircraft wing surfaces is a problem of considerable concern to those involved in aircraft operation during times of inclement weather conditions. Because ice build-up increases the weight of the aircraft, and reduces the lift capability provided by the wing surfaces, removal of the ice formed on the wing surfaces is necessary before flight of the aircraft is permitted.

One existing method for removing ice from aircraft surfaces involves spraying the aircraft with a water and glycol mixture while the aircraft is in a parking area awaiting clearance for take-off. However, the aircraft is frequently required to wait in a long queue prior to obtaining clearance for take-off. During this wait, new build-ups of ice may form on the aircraft surfaces. In the event of such an occurrence, the aircraft must be removed from the queue and returned to the de-icing area whereat the water and glycol mixture is again applied to the aircraft surface areas. Also, once the aircraft engine(s) is operating, an ethylene glycol and water spray can no longer be used for deicing. This increases flight delay time, and passenger frustration.

A microwave ice prevention system disclosed in U.S. Pat. No. 4,365,131 to Hansman, Jr. prevents the formation of ice on an aircraft surface by positioning microwave generators beneath the aircraft surfaces. The microwave electromagnetic energy is transferred to water droplets falling on the aircraft, thereby preventing the water droplets from freezing. However, because the system requires many microwave generators to be positioned just beneath the surface of the aircraft, the system is complex and costly.

It is therefore the object of the present invention for providing a system to remove ice and snow from aircraft and other surface areas while overcoming the disadvantages associated with the prior art.

SUMMARY OF THE PRESENT INVENTION

In accordance with the present invention, an ice and snow removal system is disclosed for removing ice from a surface, such as an aircraft wing surface. The system includes a laser light generating means for generating heat producing light, and lens means positioned to focus the beam, and to direct the light generated by the light generating means upon the surface to thereby vaporize the ice and snow formed thereupon. A positioning means is further included for positioning the laser light generating means proximate to the surface. The positioning means may, for example, be comprised of an articulated arm assembly, and the laser light generating means may be mounted in a supportive housing assembly positioned at an end portion of the arm member.

In a further embodiment of the present invention, the articulated arm member is mounted on a motorized vehicle, such as a truck, to further increase the movability of the positioning means.

The ice removal system may further include a suction means to dispose of snow-ice-water residue in a vacuum system or a blower assembly to force a coolant to prevent overheating of the surfaces upon which the light is directed.

BRIEF DESCRIPTION OF THE DRAWINGS

The present invention will be better understood when read in light of the accompanying drawings in which:

FIGS. 3 and 4 illustrate alternate positioning means which may be utilized by the present invention;

FIG. 5 is an illustration of a further embodiment of the laser de-icing mechanism of the present invention.

DESCRIPTION OF THE PREFERRED EMBODIMENT

Figure 1:
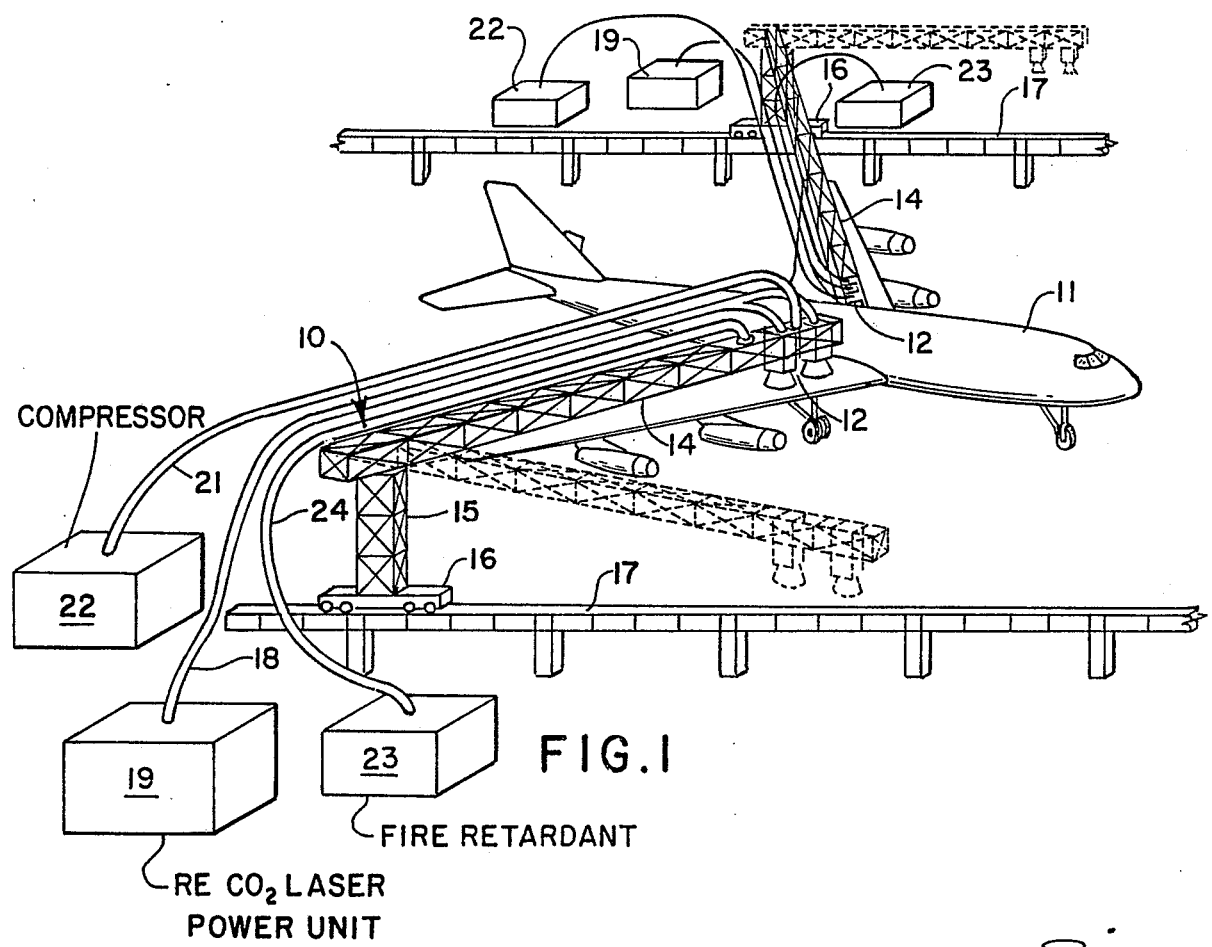
FIG. 1 is a partial schematic, partial block illustration of the laser-ice removal mechanism of the present invention.

Referring first to the illustration of FIG. 1, there is shown one embodiment of a laser de-icing system 10 of the present invention for de-icing an airplane 11. The system 10 includes laser light generating assemblies 12 mounted on a positioning means, here embodied as a lateralizing boom arm 14. The boom arm is pivotally mounted on an upstanding column 15 carried by a trolley 16 for movement along rails 17. It is preferred to provide a boom arm and associated structure at each of opposite sides of the aircraft so that both wing surfaces can be de-iced simultaneously. Each boom arm carries supply lines which include an electrical cable 18 to supply the laser light generating assemblies 12 with electrical power. Each of the two laser light generating assemblies 12 on each arm preferably includes a radio-frequency excited, sealed, carbon dioxide laser. Functioning of the present invention is predicated upon the use of a laser having a superficial heat generative capability. Cable 18 extends from the boom to a ground mounted electrical supply station 19. Also extending along the boom to the laser assembly 12 are supply lines 21 from a ground mounted blower and a compressor 22. For reasons of safety, a supply 23 for fire retardant can be delivered by line 24 along the boom to the laser light generating assemblies 12.

As is well known in the art, a laser emits a highly coherent light beam of a defined energy and wavelength. The laser (an acronym for Light Amplification by Stimulated Emission of Radiation) is actually an optical resonator in which the material of the resonator, called the active medium, is forced to radiate, and emit radiation as a stimulated emission, and is caused by first exciting the particles of the active medium to force the electrons of the particles to a higher energy level. This process is referred to as population inversion.

This excited, inverted state is unstable, and the electrons, which would normally spontaneously return to the lower energy state (and emit a quantum of optical energy), are caused by the optical resonator to return to the lower energy level in phase by a process known as stimulated emission in which an even greater amount of optical energy is emitted.

When an electron transition from a higher energy state $E_a$ to a lower energy state $E_b$ occurs, the energy released appears in the form of electromagnetic radiation of a certain frequency. The energy given off is defined by the equation:

$$\Delta E = E_a - E_b = h\nu$$

wherein h is Planck's constant ($6.625 \times 10^{-34}$ joule-sec), and v is the frequency of the electromagnetic radiation (in Hertz).

While this equation assumes a classical concept of an atom, and is more accurately defined by a probabilistic description of an atomic wave function, the direct relationship between the energy given off and the frequency thereof holds true in other atomic modes. Any one of a number of different substances or combinations of substances can be chosen to form the active medium in the laser used to melt snow and ice according to the present invention. One basic tenet in the selection for the active medium is that the skin and subsurfaces of the wings and other areas such as the fuselage which are exposed to the laser must not be heated to any significant great extent in the de-icing process with the engines running and with jet fuel tanks in the wings. With this in mind a $CO_2$ active medium is preferred because it will operate to vaporize ice and snow without affecting the skin on the wings due to the superficial action of the light beam generated by the carbon dioxide medium. Thus it is been found that the energy density of a light beam generated by a carbon dioxide laser penetrates the ice on the skin of an airplane wing, for example, only about one or two millimeters. In the following Table various active materials are identified in relation to the wavelength of light produced by the laser.

TABLE 1

| Medium | Phase | Wavelength |
| --- | --- | --- |
| $CO_2$ | Gas | 10,600 nm (IR) |
| Hydrogen fluoride (HF) | Gas | 2,950 nm (IR) |
| Er:YAG | Solid | 2,940 nm (IR) |
| Nd:YAG | Solid | 1,320 nm (IR) |
|  |  | 1,064 nm (IR) |
| Gallium arsenide ("mid") | Solid | 904 nm (IR) |
| Ruby | Solid | 694 nm (IR) |
| Helium-neon (He—Ne) | Gas | 632 nm (IR) |
| Tunable dye | Liquid | 630 nm (red) |
|  |  | 577 nm (yellow) |
| Gold vapor | Gas | 628 nm (red) |
| Copper vapor | Gas | 578 nm (yellow) |
|  |  | 511 nm (green) |
| Frequency-doubled Nd:YAG | Solid | 532 nm (green) |
| Argon | Gas | 515 nm (green) |
|  |  | 488 nm (blue) |
| Excimer |  |  |
| XeF | Gas | 351 nm (UV) |
| KrF | Gas | 248 nm (UV) |
| ArF | Gas | 193 nm (UV) |

1 nm = $10^{-9}$ m

Of these active mediums, the wavelength of light emitted is chosen in the infrared range with wavelengths between 10,600 nm and 2,940 nm.

Thus, according to the present invention, it has been found that lasers in the infrared wavelength of the spectrum are useful because of their superficial heating capabilities that permit the vaporization-melting of snow and ice without significant and particularly detrimental heating of subsurface strata on which the snow and ice may be deposited. In contrast to this, for example, light waves in the much shorter wave length spectrum commonly identified as X-rays and gamma rays are unsuitable because such rays penetrate deeply into metals as well as concrete and most other substances. Fuel tanks in aircraft wings could be adversely affected by such shorter wavelength light rays.

Figure 2:
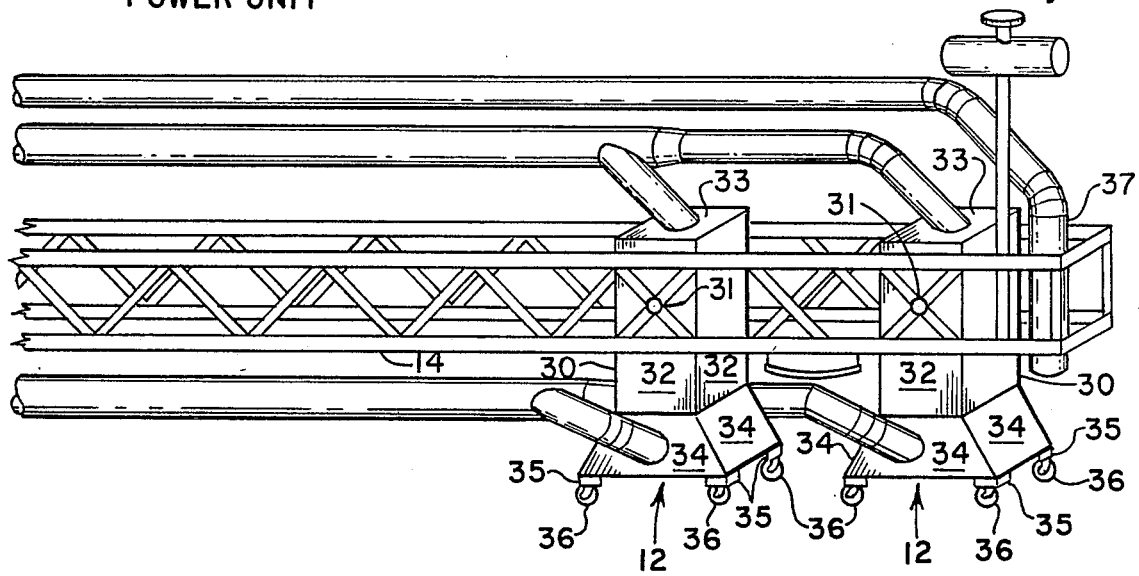
FIG. 2 is an enlarged elevational view of laser and support structure shown in FIG. 1.

Referring now to FIG. 2, each of the laser light generating assemblies 12 are supported within housing 30. A lens 31 is supported in housing 30, and is positioned in front of a laser discharge opening to broaden the non-divergent light generated by the laser light generating means 12. Each housing 30 includes rectangular side walls 32 extending from a top wall 33 to an outwardly flared skirt 34 made of transparent plastic which is absorptive to laser light for protecting the area about the impingement site from any stray light emission. On the bottom edge of the skirt 34 are pressure sensitive members 35, such as load cells which support casters 36 protruding from the laser surface thereof to allow rotational movement of the housing along a surface during de-icing. The pressure sensitive member provides a control basis to prevent excessive loading by the boom on the surface undergoing de-icing. Each housing further supports safety apparatus including a nozzle 37 to allow the supply of a fire retardant material to the de-iced surface, and other nozzles to supply coolant air and suction to the de-iced surface.

While the positioning means for laser de-icing mechanism 10 illustrated in FIG. 1 is a pivotal boom, it is contemplated by the present invention that a telescoping arm member 40 can be used as shown in FIG. 3. The telescoping arm 40 includes a plurality of arm segments 41 that can slide one within another. An actuator 42 operates to extend and retract arm segments. The arm is pivotally supported by a pedestal 43 and carries a laser light generating assembly 12 on the free end of the telescoping arm 40. Illustrated in FIG. 4 are two articulated arm assemblies 45 and 46 comprised of a plurality of arm members 47 hingedly coupled to one another at end portions. The arms of each assembly are pivotally interconnected by hinge pins 48.

Laser de-icing mechanism of FIG. 3 is advantageous in that the laser light generating assembly 12 may be located in the runway area of an airfield to thereby allow de-icing of aircraft just prior to take-off. The laser assembly 12 is preferably positioned to remove ice formed on a wing surface 49 of airplane 50. An operator may actuate telescoping arm member 40 to position laser light generating means 12 above any surface portion of wing 49. By translating the telescoping arm member, translation of laser light generating means 12 is also caused, thereby allowing heating of other wing and/or fuselage surface portions, and in turn causing ice to be vaporized from all external surfaces of the airplane 50. By positioning two laser de-icing mechanisms on opposite sides of the airplane 50, ice removal operations may be performed on both wings of aircraft simultaneously. Because the positioning of laser de-icing mechanism is only limited by the requirement of proximity to a power supply, de-icing of the airplane according to the system of the present invention is allowed in the runway area of an airfield, thereby obviating the requirement that an aircraft leave the take-off queue in order to be deiced.

A further embodiment of the present invention is illustrated in FIG. 5 in which there is provided a wheeled vehicle 51 to support a laser light generating assembly 12 for movement about an area to undergo de-icing. The wheeled vehicle includes a transparent plastic frame 52 supported by wheels 53 so that the vehicle can be moved about an area such as a driveway or walkway by an operator through force exerted by a handle assembly 54. The laser light generating assembly 12 is mounted onto the frame 52 and extending from the assembly 12 is a power supply line 55 and a conduit line 56. The power supply line extends to a ground mounted power unit 57 and the conduit line extends to a ground supported blower and suction generators 58.

Figure 6:
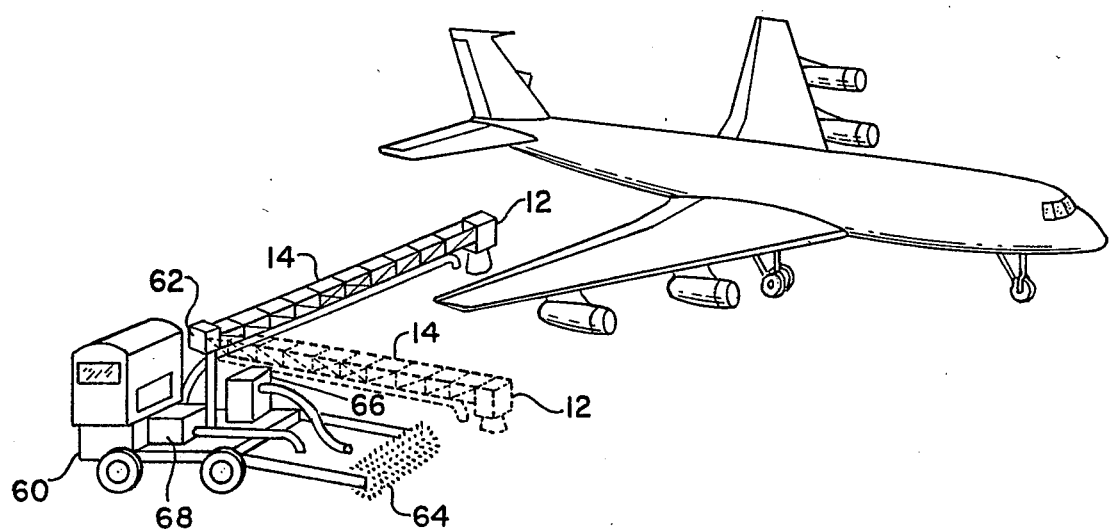
FIG. 6 is a schematic illustration of the laser de-icing mechanism positioned proximate to an airplane to allow removal of ice from surface portions of the roadway.

A still further embodiment of the present invention is illustrated in FIG. 6 in which the laser de-icing system 10 is supported to extend from a motorized vehicle, here shown to be truck 60. Again, laser light generating assemblies 12 are positioned at end portions of lateralizing boom arms 14. Boom arms 14 are pivotally supported from support member 62 of truck 60. Also illustrated in the embodiment shown in FIG. 6 are roller brush assembly 64 extending in front of truck 60, blower assembly 66, and suction assembly 68. Assemblies 64, 66, and 68 function to sweep the flightline of snow, water, ice, and other debris.

While the present invention has been described in connection with the preferred embodiment shown in the various figures, it is to be understood that other similar embodiments may be used or modifications and additions may be made to the described embodiment for performing the same functions of the present invention without deviating therefrom. Therefore, the present invention should not be limited to any single embodiment, but rather construed in breadth and scope in accordance to the recitation of the appended claims.

We claim:

1. An ice and snow removal system for a surface, comprising:
   laser light generating means for generating a heat producing beam to superficially liquify ice on a surface;
   ground-based means for supporting and positioning said laser light generating means in a desired orientation relative to said surface and for positioning the laser light generating means in said desired orientation proximate to said surface; and
   lens means positioned to focus the beam generated by the laser light generating means and for directing the light into a broadened beam width upon said surface to thereby vaporize the ice and snow formed thereupon.

2. The system of claim 1 wherein said laser light generating means includes a carbon dioxide laser.

3. The system of claim 1 wherein said positioning means includes a lateralized boom arm member.

4. The system of claim 3 further including a supportive housing assembly for supporting the laser light generating means from an end portion of the lateralized boom arm member.

5. The system of claim 1 further including auxiliary blower or suction means supported by the supporting and positioning means for helping prevent snow accumulation in case of excessively heavy precipitation.

6. The system of claim 5 wherein said auxiliary means is comprised of a blower assembly for providing forceful air stream and suction apparatus for drawing and disposing of precipitation and debris.

7. The system of claim 1 wherein said supporting and positioning means includes an articulated arm member.

8. The system of claim 1 wherein said supporting and positioning means includes an accordion arm member.

9. The system of claim 1 wherein said supporting and positioning means includes a motorized vehicle.

10. A method for de-icing an airplane comprising the steps of:
    positioning a laser beam generating means proximate to a surface portion of the airplane;
    directing light generated by the laser light generating means onto said surface to thereby vaporize snow and ice accumulated thereupon; and
    translating the laser beam generating means along the surface of the airplane to vaporize ice and snow accumulated thereupon.

11. The method of claim 10 including the further step of removing precipitation and debris.

12. The method of claim 11 wherein said precipitation and debris are removed by a suction means.

13. The method of claim 11 wherein said precipitation and debris are removed by a blower means.

14. Airplane surface de-icing and snow melting mechanism for an airplane exterior surface, said mechanism including:
    laser light generation means for generating a heat-producing beam to superficially liquify ice and snow on the airplane surface;
    means for supporting and positioning said laser light generation means in a desired orientation relative to the airplane surface and for positioning the laser light generating means in said desired orientation proximate to the airplane surface; and
    lens means positioned to focus the beam generated by the laser light generating means and for directing the light into a broadened beam width upon said surface to thereby vaporize the ice and snow formed thereupon.

15. The airplane surface de-icing and snow melting mechanism of claim 14 wherein said supporting and positioning means includes a lateralized boom arm member.

16. The airplane surface de-icing and snow melting mechanism of claim 14 wherein said supporting and positioning means includes an articulated arm member.

17. The airplane surface de-icing and snow melting mechanism of claim 14 wherein said supporting and positioning means includes an accordion arm member.

18. The airplane surface de-icing and snow melting mechanism of claim 14 wherein said supporting and positioning means includes a motorized vehicle.

19. The airplane surface de-icing and snow melting mechanism of claim 14 further including auxiliary blower or suction means supported by the supporting and positioning means for helping prevent snow accumulation in case of excessively heavy snow.

20. The airplane surface de-icing and snow melting mechanism of claim 19 wherein said auxiliary blower or suction means is comprised of a blower assembly for providing forceful air stream and suction apparatus for drawing and disposing of precipitation and debris.

21. The system of claim 1, further including auxiliary blower or suction means supported by said supporting and positioning means for helping prevent snow accumulation in case of excessively heavy precipitation.

* * * * *